United States Patent [19]
Hunkar

[11] 3,759,648
[45] Sept. 18, 1973

[54] EXTRUDER CONTROL SYSTEM

[75] Inventor: Denes B. Hunkar, Cincinnati, Ohio

[73] Assignee: Hunker Instrument Development Laboratories, Inc., Cincinnati, Ohio

[22] Filed: Sept. 15, 1971

[21] Appl. No.: 180,548

[52] U.S. Cl............... 425/140, 425/326, 264/40, 264/98
[51] Int. Cl............................................ B29d 23/03
[58] Field of Search................ 425/326, 387, 140, 425/147, 145, 142, 148, 163, 172; 264/40, 98, 99

[56] References Cited
UNITED STATES PATENTS

| | | | |
|---|---|---|---|
| 2,854,691 | 10/1958 | Strong................................ | 425/139 |
| 3,611,483 | 10/1971 | Amsden et al.................. | 425/326 X |
| 2,928,120 | 3/1960 | Leghorn et al. ................ | 425/326 X |
| 2,958,171 | 11/1960 | Deckers.......................... | 425/140 X |
| 3,122,782 | 3/1964 | Moore ............................ | 425/145 X |
| 3,286,302 | 11/1966 | Doering............................ | 425/145 |
| 3,492,700 | 2/1970 | Kornmayer ...................... | 425/145 |

FOREIGN PATENTS OR APPLICATIONS 207,864  9/1956  Australia............................ 425/140

Primary Examiner—J. Spencer Overholser
Assistant Examiner—Michael O. Sutton
Attorney—Edward B. Evans et al.

[57] ABSTRACT

An extruder control system for providing extruded products of equal lengths particularly for parison extruders in blow molding machines. A continuous feed extruder, when used with a plural mold apparatus, must extrude at a precise rate to provide a proper length parison to each mold. The control system measures errors in the length of the product delivered to each mold and makes a compensating adjustment in the extrusion rate of the extruder. The extrusion rate and product length are dependent on material viscosity which is varied by changing the rotational speed of the plasticizing screw. The control system compensates for material viscosity fluctuations and allows the extruder speed to follow that of the mold apparatus.

8 Claims, 2 Drawing Figures

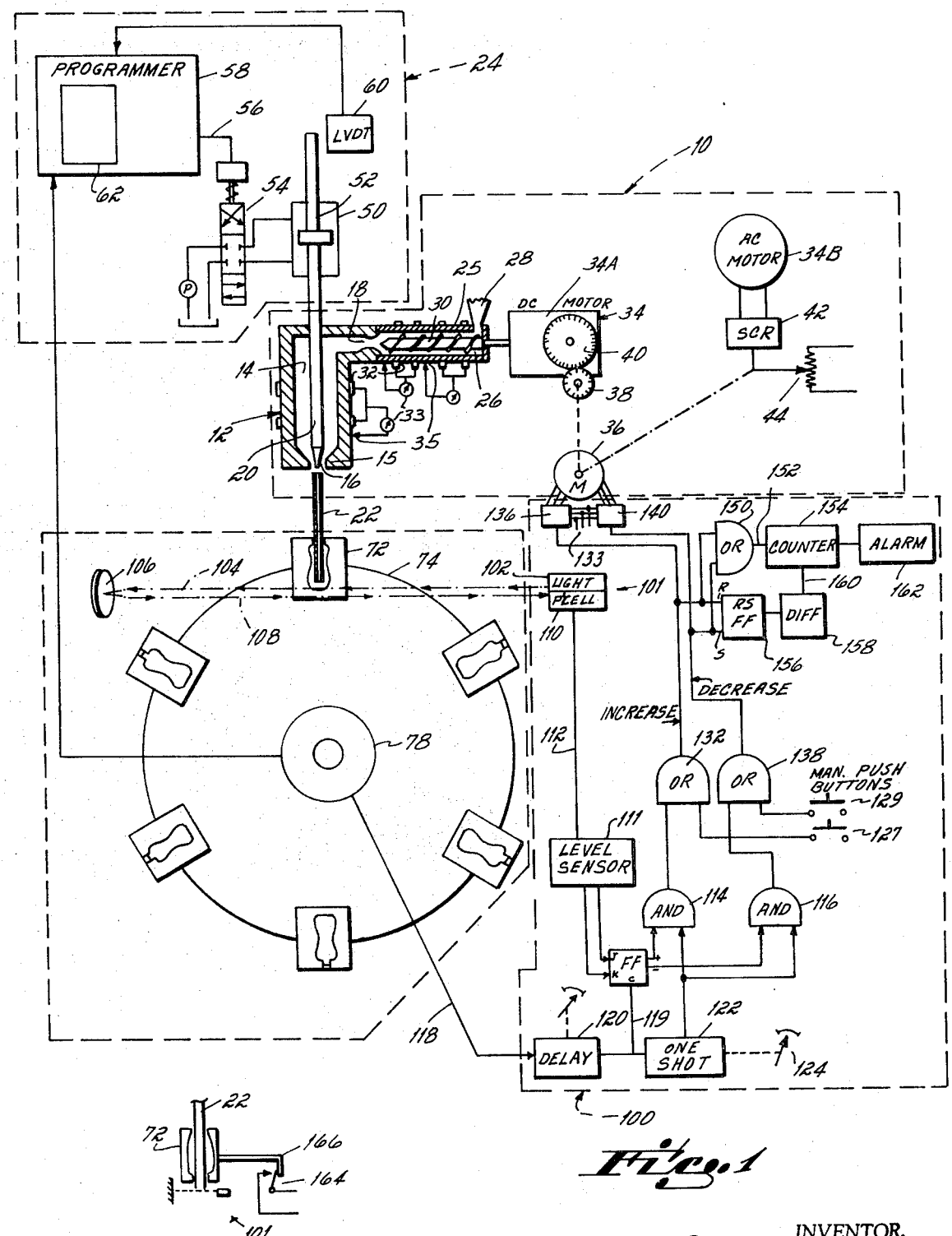

EXTRUDER CONTROL SYSTEM

The present invention relates to controls for extruders and particularly to controls for parison extruders for blow molding machines.

While certain contributions of the present invention will be found generally useful in extruding products to equal lengths in forms such as sheet material or pipe, particularly of thermoplastic materials such as polyethylene and polyvinyl chloride, the invention is most useful in solving problems encountered with parison extrusion in blow molding machines and accordingly these problems and the invention are described in this environment.

Blow molding machines are most commonly used to form containers such as plastic bottles. The forming procedure essentially involves two operations which are performed on two distinct apparatus. The first apparatus consists essentially of an extruder which plasticizes a thermoplastic material such as polyethylene or polyvinyl chloride and forces it through an annular orifice to form a hollow tube or parison. The second apparatus is a mold machine which is connected to the extruder and which operates to present a mold surrounding the extruded parison. The surrounded parison is subjected to internal pneumatic pressure which inflates it against the interior walls of the mold cavity. Most mold machines are provided with a plurality of molds which move sequentially past the extruder, each receiving the parison and then, after it is inflated or blown, carrying it away from the extruder to where it is cooled and ejected.

For some applications, it is suitable that the extruder extrude parisons of uniform wall thickness. In other applications, however, it is desirable that the wall thickness be non-uniform to provide extra material at the points where the mold is to be blown to a larger diameter and thus insure that the ultimate product possesses the proper wall strength at all points. This variation in wall thickness is achieved by providing the extrusion machine with a programmable control. Such a control is disclosed in my copending application Ser. No. 875,448 filed Nov. 10, 1969.

In operating the two types of apparatus described above efficiently in combination, it is important to insure that a proper length parison will be extruded to each mold during each respective cycle of operation of the mold machine. When the length of the parison extruded is too long, an excessive "bottom flash" or "tail" results. This tail must be trimmed off the finished product as scrap. This scrap material can be recycled in some cases, but there are limits and exceptions to this procedure. For example, polyvinyl chloride has a tendency to carbonize through repeated plasticizing operations and therefore the possibilities of recycling this material are limited. Furthermore, a relatively small ratio of recycled material to new material must be maintained in order to maintain the properties of the mix suitable for the blow molding operations, even for materials such as polyethylene, which will tolerate repeated recycling. Thus, excessive scrap material cannot always be consumed as fast as it is produced, and so must be wasted rather than recycled. If the lengths of parison extruded are too short, the mold will not be properly filled. It is essential that the parison extend to the bottom of the mold where it can be pinched or sealed to form the bottom of a bottle. If it does not, the product is defective and the entire parison is scrap. It is therefore highly desirable that the parison lengths be maintained within some predetermined range for optimum operation and efficiency.

It is a primary objective of the present invention to effect a control for blow molding machines and the like which will afford the extrusion of parisons or products of constant length from cycle to cycle of operation.

In cases where the parison has a programmed non-uniform wall thickness, it is particularly critical that the length of the parison be precisely controlled. If the tail varies from operation to operation to any appreciable degree, the respective portions of the wall of the extruded parison will not coincide with the sections of the mold for which they were programmed, and an inferior or unusable product can result. The programmers are typically synchronized to correspond on a time basis to the operating cycles of the mold machine and the extruder. However, factors affect the length of the extruded product other than the timed operation cycle of the machines. The effects of these factors cannot normally be overcome by any type of synchronization on a time basis and are present in both the programmed and the constant wall thickness parison devices.

It is another objective of the present invention to provide a corrective control which will provide precise synchronization of the extruder to the mold to capture the program at the precise point in the extrusion cycle.

The quantity of material in an object extruded from an orifice is dependent to a major degree on three factors. These factors are the pressure within the extrusion chamber, the geometry of the orifice, and the viscosity of the material to be extruded. Normally, the geometry of the orifice is precisely controlled from cycle to cycle. That is, it is either constant or programmed to vary in a substantially identical manner during each cycle. The viscosity of the material to be extruded is, however, generally proportional to the amount of thermal energy per unit mass of the product within the extrusion chamber which is controlled in two ways, the first by directly heating the material and the second by mechanically working the material to impart energy to the material. The pressure of the material within the extrusion chamber is dependent on many factors such as the flow rate of the material through the extruder, as does the viscosity of the material and the friction between the material and the extrusion structure, and the force applied. Control of the quantity of material extruded, therefore, is controlled by affecting these three factors.

It is another objective of the present invention to provide an extruder control effective to regulate the mass or quantity of material extruded in each machine cycle.

Normally, extruders for blow molding machines are of two basic types. One type is the continuous or constant rate extruder and the second is the intermittent rate extruder. In both types, material is fed into the extrusion chamber from a plasticizing chamber. Usually the rotation of a plasticizing screw moves pelletized thermoplastic material from a hopper into the extrusion chamber while mechanically working it and compressing it to aid in the plasticizing of the material through the imparting of energy to the material. In the plasticizing chamber as well as the extrusion chamber, heat is applied directly through heater elements to aid in the plasticizing of the material. The plasticizing of the material is achieved by raising of the temperature of the material which reduces the viscosity of the material.

In continuous extruders, the material is advanced from the plasticizing chamber to the extrusion chamber by the rotation of the screw which is axially fixed in the extrusion chamber. This causes a parison to be continuously extruded from the orifice. Thus, the parison length is determined solely by the ratio of the extrusion rate to the operating frequency of the mold apparatus.

In intermittent extruders, plasticized material is accumulated and then ejected from the machine for just a portion of the cycle. This is accomplished in practice in two ways. One way is by employing a reciprocating plasticizing screw which retracts to fill the plasticizing chamber and then advances to eject material from the plasticizing chamber through the extrusion chamber and from the orifice. Another way is by providing the extruder with an accumulation chamber at the upper end opposite the orifice in the extrusion chamber, and a ram which retracts during the fill portion of the cycle and advances during an extrusion portion of the cycle to extrude a parison from the orifice. The intermittent machines are primarily used with materials which are to be extruded to exceptionally thin-walled parisons or to products of large sizes. In these cases, the continuous feed operation may be too slow to prevent a deforming by gravity flow of the material once it has been extruded and therefore the relatively fast extrusion cycle is required. These machines, however, cannot be used with materials which must be kept continuously moving through the extrusion apparatus to prevent a freezing or setting of the material in the apparatus. This is often the case with polyvinyl chloride.

In both continuous and intermittent extruders, but more particularly in continuous extruders, it has been found that changes in the viscosity of the plasticized material have a great effect on the fluctuation in the length of the extruded parison over a sustained period of operation of the machine. These variations in viscosity are related to several factors. One factor is a variation in the plasticizing screw drive due to slippage in the drive. Another is the irregular manner in which the heating elements conduct heat into the extrusion and plasticizing chambers. This factor is normally due to the time lag in the response of the heating elements to temperature deviations within the chamber as sensed by a temperature probe which controls the elements. For example, many heaters have simply an on-off type of temperature control and are positioned about the exterior of the plasticizing chamber so that some time lag is required for heat to propagate into the plasticizing material and be in turn sensed by the temperature sensor. This usually causes overcompensation for temperature deviations and thus alternating fluctuations in the temperature and viscosity of the material. Another factor affecting viscosity is the non-uniformity of the mix of plastic material applied to the plasticizing chamber. Normally, new plastic material is mixed with a varying amount of scrap material and typically the new and scrap materials do not have the same plasticizing properties. Furthermore, in many cases pigments are added to the mix to form colored products, and the pigments have been found in many cases to drastically change the properties of the mix, especially relating to the viscosity of the mix under certain conditions.

It is one of the principal objectives of the present invention to provide a means for maintaining a constant viscosity of the plasticized material to be extruded.

While the extruded mass, as pointed out above, is dependent on orifice geometry, pressure, and viscosity, it has been found that, in the extrusion of a parison, with the orifice geometry precisely controlled, the length of the parison extruded in a given time period serves as a direct measurement of pressure viscosity factors.

It is another important objective of the present invention to provide a relatively simple and reliable means for measuring such factors to effect their control. It is a more specific objective of the present invention to control the extruder in direct response to a closed loop feedback system to the extruded product length. More particularly, it is an objective of the present invention to measure the length of the extruded product in a given extruder cycle of operation and to control the viscosity of the material in such a manner as to compensate for variations in the lengths of the extruded products.

It is a further objective of the present invention to measure a viscosity dependent parameter of the extruded product such as its length and to adjust the plasticizing screw speed in the extrusion machine to vary the extrusion rate to provide a predetermined parison length.

It is a further objective of the present invention to provide such a closed loop feedback system in the combination of an extruder and mold apparatus which varies the extrusion rate in response to a parison length measurement made during an operating cycle of the mold apparatus so that the extruder speed follows that of the mold apparatus. A more specific objective is to employ such a system with a continuous extruder in combination with a plural mold apparatus, and more particularly to employ a system which operates to control the speed of the plasticizing screw.

Accordingly, the present invention is predicated in part upon the concept of controlling the extruder speed or other factor affecting viscosity through a closed loop feedback system in direct response to the extruded product length. More particularly, in accordance with the present invention the length of the extruded product in a given extruder cycle of operation is measured and utilized to control the viscosity of the material to compensate for variations in the quantity of material in the extruded products. The viscosity is preferably controlled by variation of the plasticizing screw speed, but control of other factors such as temperature or mix composition is also contemplated. For parison extrusion the quantity of extruded material is preferably measured by sensing the length of the parison at a given instant in a machine cycle. This invention is also predicated in part upon the concept of controlling the extrusion rate of a parison extruder in response to a measurement of the lengths of the extruded products at times determined by the operation of the mold apparatus.

Specifically, the present invention provides a means for sensing the length of the parison at a specific moment in the cycle of a blow molding machine and particularly of a point in the cycle as determined by some operation of the mold machine. The sensing determines specifically whether a parison is either too long or too short and, in response to this determination, a correction signal is applied to the motor speed control of the plasticizing screw drive to increase or decrease the extruder screw speed and thereby correct the parison length. The sensing is achieved by a photocell mounted in a position near the mold assembly in such a way that the photocell may view the end of the parison just prior to mold closure. If the end is not sensed at this instant, then it is determined that the parison is too short and a digital signal of a predetermined value adjusts the extruder screw speed upwardly by a predetermined amount. If the parison is sensed, then it is assumed that the parison is too long and a correction signal is applied to adjust the screw speed downwardly by a predetermined amount. If the mold machine increases or decreases in speed, the measurement will reflect this in short and long determinations respectively and the corrective signal will adjust the extruder speed accordingly.

The predetermined amount of correction is adjustable to control the sensitivity and the error tolerance of the system and to permit the system to adequately follow the fluctuations of the error causing factors. The system is further provided with a means to detect an inability of the machine to compensate for certain errors and this is achieved by sensing a long succession of correction signals in the same direction. This detection will cause an alarm to be signalled. This provides a means for detecting such occurrances as an exhaustion of material from the hopper.

The advantages of the present invention are that constant tail length and parison length can be reliably provided and also that the programmed parison can be captured in the mold in precisely the position for which it was programmed. A further advantage of the present invention is in the provision for compensations in various factors, not only those which result in variations in extrusion rate only from within the extruder, but those that result in change in the cycle type which require a different rate such as varying mold machine speeds.

These and other objectives and advantages of the present apparatus will be readily apparent from the following detailed description of the drawings, illustrating a preferred form of the present invention in connection with a blow molding machine having a continuous feed parison extruder and a plural mold rotary mold apparatus.

FIG. 1 is a diagrammatic representation of one preferred embodiment of the present invention.

FIG. 2 is a diagrammatic representation illustrating a variation of the preferred embodiment of the invention illustrating particularly the mold closure portion of the mold apparatus.

DETAILED DESCRIPTION OF PREFERRED EMBODIMENT

The preferred embodiment of the extruder control system according to the present invention is illustrated in the diagram of FIG. 1, in connection with a blow molding machine. The machine includes a conventional parison extruder 10 of the continuous feed type. The extruder 10 is provided with a die element 12 defining an extrusion chamber 14 having an opening 15 at one end thereof from which plasticized material is extruded and an input port 18 into which the plasticized material is injected into the chamber 14.

The opening 15 of the die 12 has positioned concentric therewith a mandrel 20. The mandrel 20 defines an annular extrusion orifice 16 with the die 12 through which an annular tube 22 may be extruded. In machines capable of extruding tubes of only uniform wall thickness throughout their length, the mandrel 20 is fixedly mounted in the opening 15, or is adjustably mounted so that the constant wall thickness of the tubes being extruded can be selected. The mandrel 20 of the extruder with which the preferred embodiment is illustrated in FIG. 1 is, however, provided with the capability of extruding tubes of varying wall thickness throughout their lengths and as such the mandrel 20 is movably mounted in the opening 15. The orifice opening 16 is controlled by a mandrel position control 24.

The extruder 10 is further provided with a housing 25 defining a plasticizing chamber 26 which has an outlet which communicates with the inlet 18 to the chamber 14. An input hopper 28 is provided at the opposite end of the chamber 26 from the opening 18 into which pelletized plastic material is fed into the chamber 26 of the housing 25. Within the chamber 26 is a plasticizing screw 30 which is mounted to rotate within the chamber 26. The pitch of the threads of the screw 30 is designed to increase near the tip of the screw adjacent the opening 18. As the screw 30 is rotated, pellets from the hopper 28 are advanced toward the opening 18 and compressed by the increasing pitch of the screw 30. This action causes a mechanical working of the pellets which causes them to melt and plasticize to a liquid as they are forced through the opening 18 into the chamber 14. The chambers 14 and 26 are surrounded by heating elements 32 which warm the chambers 14 and 26 and further add energy to the plastic material therein to cause the material to plasticize. The temperature elements 32 are thermostatically controlled by settable control means 33 which respond to temperature sensors 35.

In parison extruders of the type illustrated in FIG. 1, the screw 30 is axially stationary within the chamber and the plasticizing and advancing of the pellets through the chamber are provided solely by the rotation of the screw. In such extruders, the plasticized melt is fed continuously through the machine from the hopper 28 through the chamber 26 and opening 18 into the chamber 14 and then through the orifice 16 to form the parison 22.

In other types of extruders, the material is intermittently extruded from the orifice. One such type employs a screw 30 reciprocatably mounted within the chamber 26. The screw retracts away from the opening 18 to fill the chamber 26 with the screw rotating to plasticize the material as the screw retracts, and then to advance toward the opening 18 to extrude material from the chamber 26 into the chamber 14 and from the orifice 16 to form the parison 22. In such machines, the parison is extruded only during the advancing stroke of the screw and the parison 22 is intermittently discharged from the opening 16.

Another type of such intermittent extruder employs an axially stationary continuously rotating screw 30 but the extrusion chamber 14 is modified to provide this intermittent extrusion from the orifice 16 by the employment of an accumulator and the reciprocating ram at the top of the chamber 14.

The reciprocating or intermittent feed type extruders are used primarily when exceptionally thin-walled tubes are to be extruded or large containers are to be formed. Such machines allow a faster extrusion of material through the orifice 6 which is desired when the containers are likely to deform under the influence of gravity over longer periods of time.

However, for most applications, the continuous extrusion machine of the type illustrated is most desirable. This machine is provided with a constantly rotating motor 34 which drives the screw 30. The motor 34 is usually provided with a motor speed control which allows the speed of the screw 30 to be adjusted to a proper level. The motor 34 is commonly used in both DC and AC forms shown alternatively as 34A and 34B in FIG. 1. The DC driven motor 34A is quite common. Its speed is normally controlled by a mechanical moving of the motor brushes to change the brush angle. The brush angle is varied through a servo motor 36 which turns a gear wheel 38 on its output shaft to drive a gear 40 on the brush housing mounting shaft. When an AC motor 34B is used, a motor speed control such as an SCR speed control 42 is commonly employed. The motor speed of this motor 34B is controlled by driving a potentiometer 44 by the servo motor 36.

Variations of the motor speed directly vary the speed of the screw 30 which affects the flow of the material in two ways. First, the increased speed of the screw will cause a faster motion or flow of the material through the extrusion device and further will cause an increase of adiabatic energy in the material which raises the temperature and decreases the viscosity of the material.

The mandrel position control 24 varies the opening of the orifice 16 throughout the given program cycle so as to vary the wall thickness of the tube 22 throughout its length. The control 24 includes a hydraulic cylinder 50 surrounding a piston 52 mounted on the shaft of the mandrel 20. The piston 52 is moved within the cylinder 50 under the control of a servo valve 52 which operates under the control of a servo amplifier output 52 within a programming module 58. The module 58 is designed to generate an output signal in proportion to the difference between the actual mandrel position as sensed by a position sensing device 60 and the programmed mandrel position as programmed upon a programming board 62. The program from the module 58 is cyclically repeating and synchronized with operation of a mold machine 70 which times the molding and the cutting off of the parison.

The mold apparatus 70 is a rotary mold machine having a plurality of molds spaced around the periphery of a rotating support. The extruder 10 is positioned above the mold machine 70 such that the parison 22 is extruded vertically downward into one of the mold elements 72 carried upon the periphery of the support 74. The mold 72 includes a pair of split mold elements which close about the parison so as to seal off the bottom opening thereof forming what is called a bottom flash or tail. The hollow portion of the tube 22 extends through the mold and from an opening at the top thereof. When the mold is closed air is blown into the tube to inflate the parison to the contour of the interior of the mold 72. After the tube is blown, the mold will continue to advance with the rotation of the support 74 and the next mold will be brought into position adjacent the extrusion orifice 16. The previously molded objects will cool and be ejected from the mold prior to that mold's returning to this position. To coordinate the program of the module 58 with the operation of the mold machine 70, a synchronizer 78 is provided which generates a signal at the proper time to initiate the program of the programmer 58.

The speed of the plasticizing screw 30 is varied by the screw speed control circuit 100. The circuit 100 is illustrated in functional logic diagram form which will enable anyone skilled in the art to construct such a control using conventional techniques. This circuit 100, in combination with a photocell sensor circuit 101, functions to maintain the length of the parison 22 at some optimum length from cycle to cycle of operation of the extruder and mold machine. This is accomplished by sensing the length of the parison 22 at some given point in each cycle of the mold apparatus and through a closed loop feedback control circuit to the screw speed control motor 34 to vary the speed of the motor to effect the extrusion of a longer or shorter parison 22 during subsequent cycles of the machine.

The sensor device which detects the length of the parison is provided with a light source 102 positioned so as to direct a light beam along a path 104 which intersects the path of the extruded parison 22 and reflects from a reflector 106 and returns along a path 108 parallel and substantially coincident with path 104 to be detected by a photocell 110. The signal from the photocell is communicated along the photocell output line 112 and through a level sensor 111, as for example a Schmitt trigger, to the J and K inputs of a J-K flip-flop 113. The alternative positive and negative outputs of the flip-flop 113 are connected each to an input of a respective one of a pair of AND-gates 114 and 116. The flip-flop 113 registers and stores the state of the photocell at the precise instant that a measurement is made, being in its positive state when the light beam is interrupted. Thus, the gate 114 is enabled only when light is received by the photocell 112 indicating that the parison 22 is shorter than an indicated length, while the gate 116 is enabled under the opposite condition when no light is received by the photocell, indicating that the length of the parison 22 is longer than the prescribed length. A synchronizing signal is received from the mold apparatus 70 through any suitable means which is effective to generate a signal indicative of a precise point in the mold operating cycle which preferably occurs at a very short time prior to the closing of the mold 72. This synchronizing signal is communicated along a line 118 through a settable delay network 120 which delivers an instantaneous pulse to the input of a one-shot multivibrator circuit 122. The pulse from network 120 is communicated along line 119 to the clock or trigger input of flip-flop 113 to set the flip-flop 113 according to the photocell condition at that instant. The delay network 120 allows the measurement to log the synchronizing signal from line 118. A long delay setting will cause a longer measurement and thus causes a shorter parison to be extruded. The duration of the multivibrator 122 time interval is made adjustable through a variable control 124 from a value of 30 milliseconds to 1 second. The output of the one-shot multivibrator 122 is communicated simultaneously to inputs to the AND-gates 114 and 116. This interval will pass through one and only one of the AND-gates 114 and 116. Manual control is provided by push-buttons 127 and 129 connected in parallel with AND-gates 114 and 116 respectively to respective inputs of OR-gates 132 and 138.

The output of the AND-gate 114 passes through an OR-gate 132 to a solid-state driver 136 which controls three-phase power from lines 153 to the servo motor 36 to drive the motor 36 in a direction which will increase its speed of the screw drive motor 34 by a given amount. Similarly, the output of the AND-gate 116 passes through an OR-gate 138 to a driver circuit 140 which is connected in series with the three-phase power lines 133 to the motor 36 which is wired in such a way as to drive a servo motor 36 in the opposite direction as the wiring from the driver 136 to decrease the speed of the screw drive motor 34 by an equal fixed amount. The drivers 136, 140 use conventional solid-state switching circuits preferably consisting of triac solid-state devices. The amount that the screw drive motor 34 is increased or decreased in speed during each cycle is controlled by a setting of the control 124 which establishes correction factor or the feedback sensitivity of the control 100.

It can be seen that, if this interval is too long, over-correction will occur. The variations in the length of the parison between consecutive cycles of operation will vary by an amount equal to that effected by the increase or decrease in length as determined by the on-time of the multivibrator 122. It will therefore be appreciated that the shorter the interval length of the one-shot multivibrator 122 that can be obtained, the better the result will be in that the smaller will be the deviation from a mean setting about the controlled or predetermined desired value of the parison light 22. However, if this interval is too short, it will not be possible for the control circuit 100 to correct for differences in length caused by other variables for which the circuit 100 is attempting to compensate. Thus, it will be found that, if the interval is too short, it will be relatively difficult or take a rather long time for compensation of deviations of appreciable magnitude to be corrected.

Under certain conditions, it will be found that it will be impossible to correct for differences in length. This will be true usually in cases where some rather serious abnormality has occurred such as the running empty of the hopper 28 and exhaustion of the supply of plasticized material, in which case the material will cease to flow through the extrusion device and no increase in speed of the motor will compensate to the degree necessary to provide a parison of proper length. During such cases, an alarm signal can be sounded by detecting the condition of repeated error signals of the same sign.

The alarm is provided by counting the number of consecutive pulses on any one of the outputs from the gate 132 and 138 of the correction circuit and resetting the counter every time a signal changes from one line to the other. This is achieved by an OR-gate 150 having inputs connected to each of the outputs of the OR-gates 132 and 138 to generate a count pulse on line 152 to increment the counter 154. An RS flip-flop 156 is provided having its R and S inputs connected across the same two inputs of the gate 150 so that it will switch following the pulses of the respective input lines. The output of the flip-flop 156 is connected to the input of the differentiator circuit 158 which generates a pulse to the reset input 160 of the counter 154 every time the flip-flop 156 changes state. This will reset the counter 154 to zero. If such resetting does not occur within a predetermined setting of the counter 154, as for example ten consecutive pulses on the same line, then an alarm signal is generated which signals an alarm enunciator 162 to signal an operator.

The circuit 100 is not only effective to control variations in the parison extruder 10 which will affect the variations in length of the extruded material 22, but is also effective to adjust the speed of the extruder 10 so as to follow the speed of the rotating mold apparatus 70. For example, if the mold apparatus were to increase in speed by a given amount, the mold would arrive at the extruder orifice or fill station sooner than before and the signal on line 118 which is responsive to the mold position will energize the photocell 101 to measure the length of the parison 22 earlier in the cycle than it would have been had the mold 70 been running at the previous slower speed. The resulting measurement will be a short parison which will cause an increase signal to be generated by the feedback control circuit 100 to increase the speed of the screw motor 34 so as to increase the extrusion to extrude longer parison lengths 22 during the next cycle. The speed of the extruder will continue to increase until the lengths extruded in the accelerated cycles are of the prescribed predetermined length.

The circuit 100 will always feed back some correction signal to the servo motor 36 and to adjust the speed of the drive motor 36, in either one way or the other. This will result in an oscillating effect on the speed of the motor 34 when the lengths are in approximately the range of the desired length. This is because the resultant measurement by the photocell sensor 101 will either detect the presence of the end of the tube 22 or will fail to detect its presence, indicating either that the length is greater or less than the desired length, but never equal to it.

Referring to FIG. 2, illustrating one form of initiating the measurement cycle by the mold apparatus 70, it will be seen that the mold 72 is a split type which closes about the parison 22 at an appropriate time in the mold apparatus cycle. FIG. 2 does illustrate an alternative method of sensing the position at which the parison length is to be measured in that the signal to the photocell is generated by the closure of a switch positioned to be tripped by the start of the mold closing operation. Such an example is effective particularly when types of mold machines such as single mold or shuttle type mold apparatus are used but this may be used with the rotary type mold apparatus of FIG. 1. This apparatus includes a switch 164 connected to the signal line 118 input of the circuit 100. It is tripped by an element 166 fixed to the movable element of the mold 72 to energize the photocell measuring device positioned at the base of the mold 72 to measure the parison 22.

The foregoing sets forth a simple and efficient means of achieving the objectives of the present invention, which provides a closed loop feedback control responsive to the product length to maintain desired length by control of the extrusion rate. The invention provides great advantages over prior art devices particularly in the control of continuous extruders for plural mold blow molding machines.

What is claimed is:

1. In a molding machine which comprises, in combination, a mold apparatus and an extruder for extruding a moldable product from an orifice to said mold apparatus, a control system comprising:
    means responsive to a condition of a mold for generating a timing signal;

means responsive to said timing signal for measuring the presence of an extruded product at a point spaced from said orifice;

means for generating a feedback signal in response to said measurement; and means for varying the extrusion rate of said product from said extruder in response to said feedback signal;

said feedback signal generating means including a circuit for generating a first feedback signal in response to the presence of said product at said point and a second feedback signal in response to the absence of said product at said point; and said extrusion rate varying means being operative to decrease said rate in response to said first signal and increase said rate in response to said second signal.

2. In a molding machine which comprises in combination a mold apparatus and an extruder including a rotary plasticizing screw for extruding a moldable product from an orifice to said mold apparatus, a variable speed drive means for said rotary plasticizing screw, a control system for controlling the variable speed drive means comprising:

means for sensing the length of an extruded product at a predetermined time in relation to the operation of said molding machine;

means for generating a control signal responsive to said length; and said variable speed drive means being responsive to said control signal for changing the rate of rotation of said screw to vary the viscosity of said moldable product.

3. The apparatus of claim 2 in which said control signal generating means includes a negative closed loop feedback system for generating an error signal representative of a difference between said sensed length and a predetermined reference value of that parameter.

4. The apparatus of claim 2 further comprising means for synchronizing the operation of said sensing means with the operation of said mold apparatus.

5. In a molding machine which comprises in combination a mold apparatus and an extruder including a rotary plasticizing screw for extruding a moldable product from an orifice to said mold apparatus, a control system comprising:

means for sensing the length of an extruded product;

means for comparing said length with a preselected length;

means for generating a control signal responsive to said comparison means; and means responsive to said control signal for changing the rate of rotation of said screw to vary the viscosity of the material which is subsequently extruded.

6. The apparatus of claim 5 further comprising means for synchronizing the operation of said sensing means with the operation of said mold apparatus.

7. In a molding machine which comprises in combination a mold apparatus and an extruder including a rotary plasticizing screw for extruding a moldable product from an orifice to said mold apparatus, a control system comprising:

means for deriving a cycle interval;

means for sensing the length of a product extruded during said cycle interval;

means for generating a control signal in response to the difference between the sensed length of said product and said predetermined length; and means responsive to said control signal for changing the rate of rotation of said screw.

8. The apparatus of claim 7 further comprising means responsive to a condition of a mold for actuating said sensing means.

* * * * *